Figure 1:
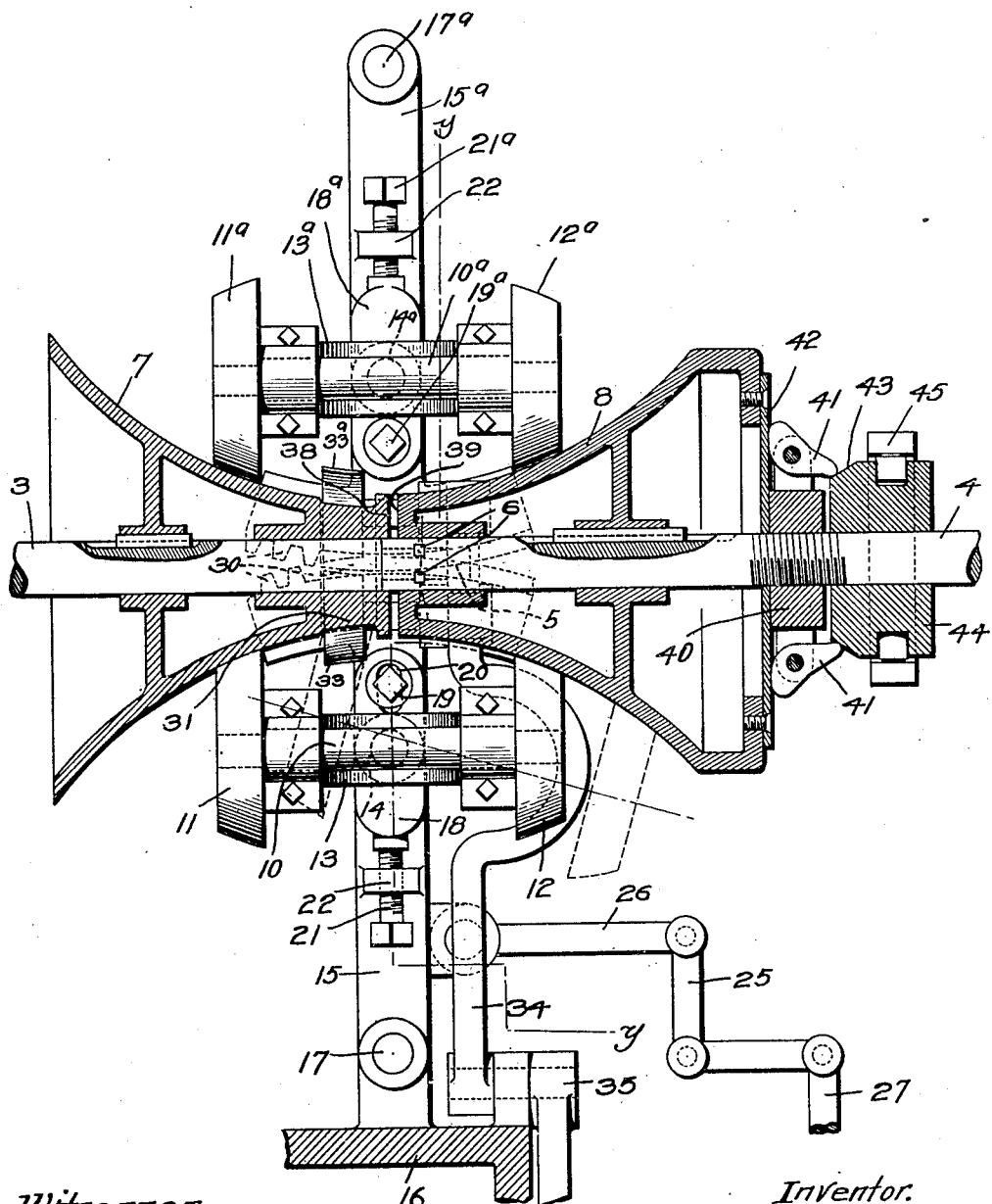

No. 875,962. PATENTED JAN. 7, 1908.
G. E. STANLEY.
VARIABLE SPEED DRIVING GEAR.
APPLICATION FILED MAR. 21, 1907.

2 SHEETS—SHEET 1.

Witnesses.
W. C. Hansford.
Joseph M. Ward.

Inventor.
George E. Stanley,
by Crosby Gregory
atty's.

No. 875,962. PATENTED JAN. 7, 1908.
G. E. STANLEY.
VARIABLE SPEED DRIVING GEAR.
APPLICATION FILED MAR. 21, 1907.
2 SHEETS—SHEET 2.
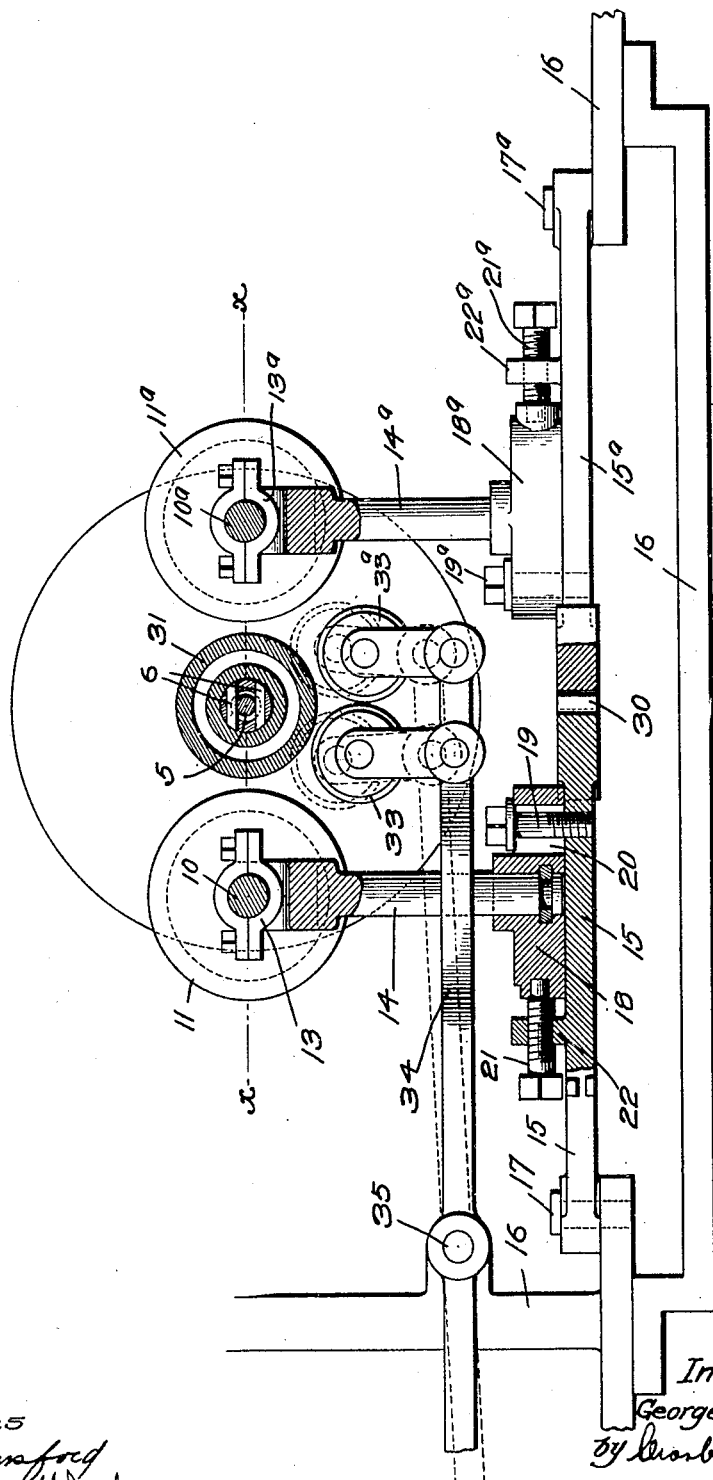
Witnesses
W. C. Lunsford
Joseph M. Ward
Inventor.
George E. Stanley,
By Crosby Gregory
Attys.

UNITED STATES PATENT OFFICE.

GEORGE E. STANLEY, OF WHITMAN, MASSACHUSETTS, ASSIGNOR OF ONE-THIRD TO JOSEPH B. WHITE, OF NORTH HANSON, MASSACHUSETTS, AND ONE-THIRD TO FRANK PADDLEFORD, OF WHITMAN, MASSACHUSETTS.

VARIABLE-SPEED DRIVING-GEAR.

No. 875,962.      Specification of Letters Patent.      Patented Jan. 7, 1908.

Application filed March 21, 1907. Serial No. 363,570.

*To all whom it may concern:*

Be it known that I, GEORGE E. STANLEY, a subject of the King of Great Britain, and a resident of Whitman, in the county of Plymouth and State of Massachusetts, have invented an Improvement in Variable-Speed Driving-Gear, of which the following description, in connection with the accompanying drawing, is a specification, like letters on the drawing representing like parts.

This invention relates to variable speed driving gear, and has for its object to provide a novel driving gear of this class all as will be more fully hereinafter described and then pointed out in the following claims.

Figure 1 is a section through a driving apparatus embodying my invention on substantially the line $x$—$x$, Fig. 2; Fig. 2 is a section on substantially the line $y$—$y$, Fig. 1.

In the mechanism which I have herein chosen to illustrate my invention, 3 is the driving or power shaft and 4 the driven shaft. These shafts are shown as axially alined with each other although capable of rotation at different relative speeds. The end of the driving shaft 3 is shown as having a projection 5 thereon, see dotted lines Fig. 1, which enters a suitable socket in the end of the driven shaft 4, and said shafts are held against longitudinal movement relative to each other by suitable keys 6 which extend transversely through the driven shaft, and are received in a groove in the portion 5 of the driving shaft. Fast on the driving shaft 3 is a cone-chaped friction member 7, and mounted on the driven shaft 4 is a similar friction member 8. The friction member 8, however, is preferably splined to the shaft 4 so that it can be moved longitudinally thereof for reasons which will be more fully explained later.

The power is transmitted from the driving member to the driven member through a transmitting member or members herein shown as a shaft 10 carrying two friction wheels 11 and 12 which are adapted to engage the two cone members 7 and 8 respectively. The shaft 10 is mounted in a suitable bearing 13 which is preferably mounted so as to turn about a vertical axis, and it is also mounted so that it may be swung to carry the friction wheels 11 and 12 into engagement with different portions of the cone-shaped members 7 and 8. This bearing 13 may be mounted in any suitable way adapted to accomplish these objects, and in the present embodiment of the invention I have shown it as carried by a standard 14 which is carried by a swinging member 15, and is preferably mounted thereon so as to turn about a vertical axis. The swinging member 15 is shown as pivoted to a fixed portion of the frame 16, as at 17, and the stem 14 is shown as carried by a foot 18 which is adjustably mounted on the swinging member 15. The standard 14 is swiveled to the foot 18, as will be plainly seen from Fig. 2. The foot 18 is shown as held in position by a bolt 19 which extends through a slot 20 in the foot and into the member 18, and is adjusted by means of an adjusting screw 21 which is screw-threaded to a lug 22 rising from the swinging member. The shape of the friction surface of the members 7 and 8 in longitudinal section is that of an arc of a circle, as will be plainly seen from Fig. 1, and this arc is one struck from the pivotal point 17 as a center.

With the friction wheels 11 and 12 bearing against the friction members 7 and 8 it will be obvious that the power will be transmitted from the driving shaft 3 to the driven shaft 4 through the transmitting member, comprising the friction wheels 11 and 12, and that the speed at which the driven member is rotated relative to the driving member depends upon the position of the friction wheels 11 and 12. For by swinging the member 15 to the left, Fig. 1, the speed of the driven member will be increased relative to the driving member, while by swinging said member 15 to the right the speed of the driven member will be decreased relative to that of the driving member.

Any suitable means may be employed for swinging the member 15, and for this purpose I have shown a bell crank 25 which is connected to the driven member by a connection 26 and may be operated by any suitable connection 27.

In order to transmit any considerable amount of power it is necessary to hold the friction wheels 11 and 12 against the members 7 and 8 with considerable pressure, and in order to prevent such pressure from throwing the parts out of line with each other, and also in order to increase the amount of power which the device is capable of transmitting I prefer to employ two transmitting mechanisms, one situated each side of the members 7 and 8. For this purpose I have provided a second swinging member 15ª similar to the member 15 and pivoted to a suitable fixed part, as at 17ª, and carrying two friction wheels 11ª and 12ª which are mounted on a suitable shaft 10ª. This shaft 10ª is mounted on a bearing 13ª similar to the bearing 13, and which is carried by a standard 14ª and is swiveled in a foot 18ª adjustably carried by the member 15ª in a manner similar to the way in which the foot 18 is carried. In this way all lateral pressure on the members 7 and 8 is equalized. For changing the speed of the driving member it is obviously necessary that the two members 15, 15ª should swing in unison. For this purpose I have provided each with gear teeth 30 which mesh with gear teeth on the other so that the movement of the member 15 will carry with it the member 15ª. I have also provided a reversing mechanism whereby the direction of rotation of the driven member may be reversed, and for this purpose I have shown the friction member 7 as having near its apex a portion 31 of slightly reduced diameter, so that when the swinging member 15 is thrown to the right to carry the friction wheels 11, 11ª, into the dotted line position they will not have direct engagement with the cone member 7.

Situated beneath the portion 31 are a pair of idlers 33, 33ª, which are normally out of contact with said portion 31, but which may be elevated to be brought into contact therewith and with the friction wheels 11, 11ª when it is desired to reverse the direction of rotation. These idlers are herein shown as carried by a swinging arm 34 which is pivoted to the frame 16, as at 35, and the arm may be elevated to carry the idlers 33, 33ª into contact with the portion 31 of the cone 7 and the friction wheels 11, 11ª by any suitable means. When the power is transmitted through the idlers, it will be obvious that the direction of rotation of the cone member 8 will be reversed. I have also provided means whereby the two cone members 7, 8 may be coupled directly together so that they may be driven as one unitary element. For this purpose, the end of the cone member 7 is provided with a friction surface 38 which is adapted to coöperate with a friction surface 39 on the end of the member 8, and means are provided for moving the friction member 8 longitudinally of the driven shaft to bring the clutch surfaces 38, 39 into engagement. While any suitable means may be employed for this purpose, I have shown the driven shaft 4 as having a collar 40 fixed thereon to which are pivoted two cam levers 41 that are adapted to act against the end plate 42 of the cone 8 and to be acted on by the beveled portion 43 of an actuating collar 44 which is slidably mounted on the shaft 4 and may be operated in any suitable way as by a fork 45. When the two parts 7, 8 are to be coupled directly together, the transmission members may be thrown out of gear either by withdrawing the bearings 13, 13ª slightly by backing off the screws 21, 21ª, to carry the friction wheels 11, 12, 11ª, 12ª, out of contact with the friction members 7, 8, or by swinging the members 15 to the right, Fig. 1, to carry the friction wheels 11, 11ª out of contact with the friction member 7.

Having fully described my invention, what I claim as new and desire to secure by Letters Patent is:—

1. In a driving mechanism, the combination with a rotatable cone-shaped friction driving member, of a similarly-shaped friction driven member, a transmitting member adapted to bear against both of said friction members, and to rotate the driven member in the same direction as the driving member and means to swing the transmitting member to cause it to engage different parts of the cone-shaped members.

2. In a driving mechanism, the combination with a rotatable cone-shaped driving member, of a similarly-shaped friction driven member, two transmitting members, one on each side of the friction members, and each adapted to bear against both friction members, and means to move the transmitting members to cause them to engage different portions of the friction members.

3. In a driving mechanism, the combination with axially-alined rotatable driving and driven cone-shaped friction members, of two transmitting members, one situated either side of the friction members, and each comprising two friction wheels to bear against said members, and means to move said transmitting members to cause them to engage different parts of the cone-shaped members.

4. In a driving mechanism, the combination with axially-alined rotatable driving and driven elements, and a cone-shaped member, carried by each, of a swinging member, and a shaft adjustably carried thereby and friction wheels on said shaft and arranged to engage the friction members.

5. In a driving mechanism, the combination with axially-alined rotatable cone-shaped friction members, of a shaft, friction wheels thereon to engage said friction members, a swinging support for said shaft whereby the latter may be moved bodily to cause the friction wheels to contact with different portions of the friction members.

6. In a driving mechanism, the combination with two axially-alined rotatable cone-shaped friction members, of two transmitting members, one each side of the friction members, each transmitting member comprising two connected friction wheels engaging the friction members, and two connected swinging members supporting the transmitting members.

7. In a driving mechanism, the combination with axially-alined rotatable driving and driven elements, a cone-shaped friction member on each element, of two transmitting members, one situated either side of the friction members, and each comprising two friction wheels to bear against said members, means to move said transmitting members to cause them to engage different parts of the cone-shaped member, and means to couple the friction members directly together.

8. In a driving mechanism, the combination with axially-alined driving and driven elements, each including a cone-shaped member of a swinging member, a shaft adjustably carried thereby and having friction wheels to engage the friction members, and means to couple the friction members directly together.

9. In a driving mechanism, the combination with axially-alined rotatable driving and driven cone-shaped friction members, of a member or support capable of turning about a fixed axis, a shaft adjustably carried by said member or support, said shaft having friction wheels engaging the friction members, and means to swing said member or support about its pivot.

10. In a driving mechanism, the combination with rotatable cone-shaped driving and driven elements, of a transmitting member adapted to bear continuously against one of said members and in certain positions to bear against the other member, and a reversing friction wheel adapted to bear against said last-named cone-shaped member and the transmitting member when the latter is in a certain position.

11. The combination with rotatable cone-shaped friction driving and driven members, of a transmitting member adapted to bear against both of said friction members and to rotate the driven member in the same direction as the driving member, means to adjust the transmitting member to cause it to engage different parts of the cone-shaped members, and means to reverse the direction of rotation of the driven member relative to the driving member.

In testimony whereof, I have signed my name to this specification, in the presence of two subscribing witnesses.

GEORGE E. STANLEY.

Witnesses:
 Louis C. Smith,
 Margaret A. Dunn.